May 13, 1924.
S. McGOWAN ET AL
1,494,000
CUTTER HEAD DRIVE FOR LAST LATHES
Filed June 20, 1921
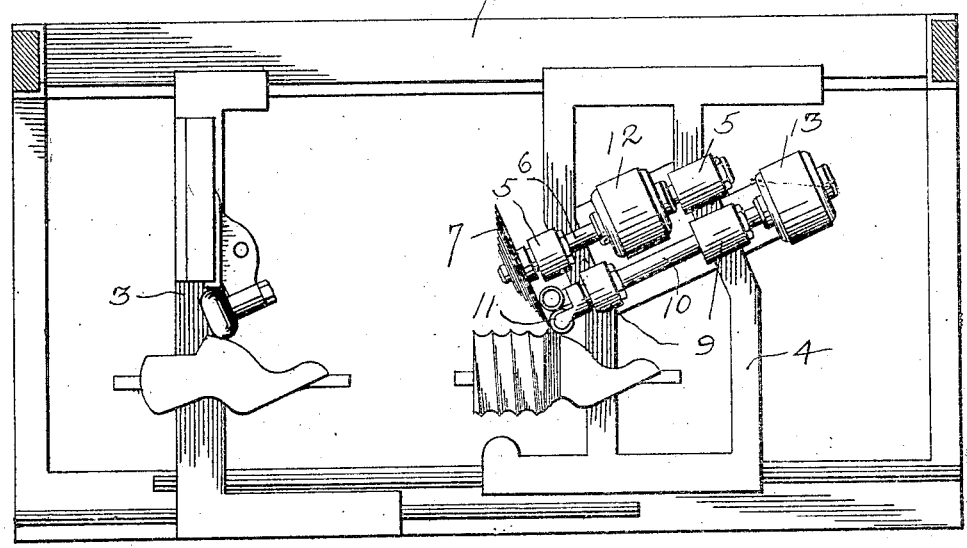
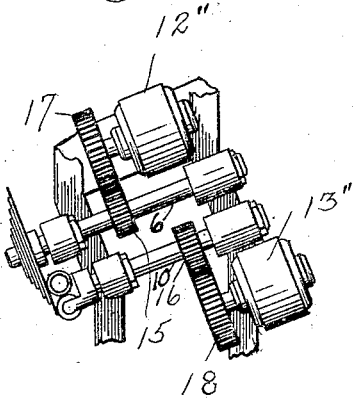
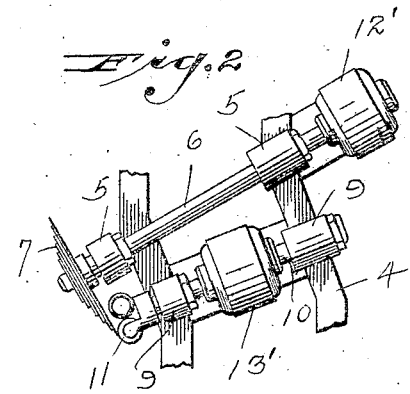
INVENTOR.
Scott McGowan
and Claud P. Long
BY F. L. Walker
ATTORNEY.

Patented May 13, 1924.

1,494,000

UNITED STATES PATENT OFFICE.

SCOTT McGOWAN AND CLAUD L. LONG, OF DAYTON, OHIO, ASSIGNORS TO THE CRAWFORD, McGREGOR AND CANBY COMPANY, OF DAYTON, OHIO, A CORPORATION OF OHIO.

CUTTER-HEAD DRIVE FOR LAST LATHES.

Application filed June 20, 1921. Serial No. 478,972.

*To all whom it may concern:*

Be it known that we, SCOTT McGOWAN and CLAUD L. LONG, both citizens of the United States, residing at Dayton, in the county of Montgomery and State of Ohio, have invented certain new and useful Improvements in Cutter-Head Drives for Last Lathes, of which the following is a specification.

This invention relates to pattern lathes for turning articles of irregular shape such as shoe lasts, heads for golf clubs, and other variable shapes and forms, and more particularly to a motor drive mechanism and mounting therefor, for driving the cutter heads, which may be mounted upon and travel with the cutter head carriage.

The object of the invention is to simplify the structure as well as the means and mode of operation of such lathes, whereby they will not only be cheapened in construction, but will be more efficient in operation, positive in action uniform in result, and unlikely to get out of repair.

A further object of the invention is to eliminate the usual driving drum and the vibration, incident to its use.

A further object of the invention is to provide driving means for the cutter heads independent of the motive power of the cutter head carriage, whereby the speed of the carriage and the cutter head, may be varied independent of each other.

A further object of the invention is to provide positively connected driving means which will eliminate the use of drive belts, and to provide such driving means rigidly upon the cutter head carriage, in intimate relation with the cutter head shaft, whereby a balanced structure will be afforded.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Fig. 1 is a top plan view of the bed of a pattern lathe, with the reciprocatory carriage mounted thereon, illustrating the application of the improved motor drive forming the subject matter hereof to parallel roughing and finishing cutter shafts. Fig. 2 is a detail top plan view of a modification of the construction shown in Fig. 1 wherein the roughing and finishing cutter shafts are located in inclined or divergent relation and the relation of the motors has been reversed. Fig. 3 is a similar top plan detail view showing a geared independent driving connection for the cutter shafts for utilizing low speed motors.

Like parts are indicated by similar characters of reference thruout the several views.

Inasmuch as the present invention pertains only to the driving means for the cutter head shafts and not to the lathe per se, only such portions of the lathe as are necessary to an understanding of the mechanism and operation have been illustrated in the drawings. The lathe to which the invention has been shown applied is of the general type illustrated in patent to Eastman 1,104,040, and more particularly that illustrated in pending application Serial No. 196,617 of Long and Schmaus.

As illustrated in these prior constructions, the cutter head shafts of such lathes have usually been actuated by a drive belt from a large drum located in the lower portion of the lathe structure. Some attempt has heretofore been made to eliminate the use of the large drum. Such constructions have usually retained the belt as the driving medium. A notable instance of such development is shown in patent to Morton 1,199,407, wherein a motor is suspended beneath the reciprocatory carriage from which power is transmitted to the cutter head shaft by a driving belt.

Belts have been found undesirable due to frequent slippage, and loss of power, and the short life of the belt incident to the high rate of speed, at which the cutter head shafts are driven. It is customary to drive the roughing cutter of the construction shown in the drawings and hereafter described, at an approximate speed of 6000 R. P. M. while the finishing cutter is rotated at the rate of 7500 R. P. M. At such high speeds the slippage or loss of power is frequently equivalent to from 300 to 500 R. P. M. and friction developed burns a leather belt, so that its average life is approximately ten days, while the fabric belts will last but a few months.

The present construction overcomes the difficulty of the driving means heretofore utilized by providing an independent driving motor for each cutter head shaft which motors are mounted on top of the reciprocatory carriage and preferably though not necessarily utilize the cutter head shaft as the armature shaft. In other words, in the present construction, a separate independent motor is employed for each cutter head and the cutter heads are directly mounted upon the armature shaft of such motor. However, in Fig. 3, there is shown a construction in which the independent motors are mounted in juxtaposition to the respective cutter head shafts to which they are interconnected for positive driving connection by gears.

Referring to the drawings, 1 is the bed of the lathe having thereon the ways on which reciprocate the model carriage 3, and cutter head carriage 4. The mechanism for advancing these carriages in unison is shown and described in the prior patents and pending application heretofore mentioned, to which reference is to be had for detailed description.

Mounted in suitable bearings 5 in the traveling cutter head carriage is a drive shaft 6, carrying at its extremity a cutter head 7, which may be of any suitable type or construction. The cutter head shaft 6 is inclined to the path of travel of the carriage, whereby the cutter head 7 rotates in an oblique plane and is advanced laterally against the work. Mounted in similar bearings 9 and extending parallel with the roughing cutter shaft 6 is a shaft 10, also inclined to the path of travel of the carriage, carrying at its forward end a finishing cutter 11. The particular construction of the cutter heads 7 and 11, is described and claimed in the aforementioned pending application of Long and Schmaus. These cutter heads are disclosed in the present instance for illustrative purposes only and it is obvious that any other type of cutter head adapted to the work to be performed may be substituted therefor.

Mounted upon the traveling carriage 4 intermediate the bearings 5—5 is a driving motor 12 of which the shaft 6 constitutes the armature shaft. In other words, the roughing cutter 7 is directly mounted upon the armature shaft 6, of the motor 12. If the motor bearings are of sufficient size to withstand the severe usage and heavy service to which the cutter 7 is subjected, the bearings 5 upon the carriage may be omitted. However, inasmuch as it is desirable to afford ample bearing surface for the shaft 6 to avoid any yielding or clatter when in use, and to relieve the motor frame 12 of as much strain as possible, the supplementary bearings 5 are preferably employed. Likewise the motor frame 12 may be devoid of bearings for the shaft 6 and contain merely the field windings surrounding the armature mounted upon the shaft 6 and the bearings 5 alone may be utilized in supporting the shaft. The same variations are applicable to the shaft 10, which carries the finishing cutter head 11. Inasmuch as the shafts 6 and 10 are located quite closely one to the other, the independent motor 13 of which the shaft 10 constitutes the armature shaft is preferably offset in relation with the motor 12. This enables the motor 12 to utilize substantially the entire space intermediate the shafts 6 and 10 while the motor 13 is afforded ample room beyond the rearmost bearing 9. If the motor 13 is located closely to the head 11 the auxiliary bearings 9 may be omitted, and bearings in the motor frame alone utilized. To the contrary, the frame of the motor 13 may be devoid of bearings and contain only the field windings surrounding the armature fixedly mounted upon the shaft 10.

This construction employing independent motors for the respective cutter heads enables the cutter heads to be directly driven at constant speed, the speed of the finishing cutter 11 being much greater than that of the roughing cutter 7. This difference in speed is effected by different motor windings, whereby the motor 13 is designed to give a much higher speed than the motor 12 whereas the motor 12 which carries upon its armature shaft the roughing cutter 7, while running at a lower rate of speed is wound to afford increased torque to enable it to perform the heavy service to which the roughing cutter is subjected.

The respective cutter shafts being independently driven by separate driving motors the strain or load to which one cutter is subjected will in no way affect the operation of the other cutter. It will be understood that in turning irregular shapes, such as shoes lasts, golf club heads and the like, the cutters operate to variable depth. When making quite a deep cut and removing an excess of material, there is a much heavier load upon the motor, or the resistance to its operation is much greater than when making a comparatively shallow cut and removing but little material. This variation of resistance or load and consequent drop in speed of the roughing cutter is communicated to the finishing cutter in those instances where both cutters are dependent upon a single driving connection. To do effective work a cutter must be driven at a high rate of speed and the character of the work performed deteriorates with speed reduction. It is therefore highly important that the finishing cutter be driven at a uniform and constant speed. The range of cutting depth of the finishing cutter is comparatively small due to the fact that the excess material is removed by the roughing cutter 7. By affording independent driving connection for each roughing cutter as herein shown and described, any slowing down or resistance to the operation of the roughing cutter is not transmitted to the finishing cutter, but the latter is driven uniformly at its prescribed speed, regardless of the load or resistance to which the roughing cutter is subjected. This results in the production of uniform work of better character.

In Fig. 2 there is shown a modification wherein the respective shafts 6 and 10 are arranged in diagonal relation or divergent one to the other and the relative positions of the motors 12 and 13 have been transposed. In this construction, the motor 13' is located intermediate the bearing 9 while the motor 12' is on the outer end of the shaft 6, shown beyond the rearmost bearing 5. It will be obvious from Figs. 1 and 2 that the shafts 6 and 10 may be arranged at any desired or suitable angle and that the motors may be positioned at any convenient point upon the shaft without in any way interfering with the operation of the respective cutter head.

In Fig. 3 there is shown a method of utilizing low speed motors in lieu of the high speed motors utilized in the construction shown in Figs. 1 and 2. Motors having the high speed rate of six thousand and seven thousand five hundred R. P. M. as is necessary for direct mounting upon the shafts 6 and 10 whereby such cutter head shafts are also the armature shafts, present some difficulties and may not always afford the necessary power for all conditions of use. While for ordinary cutting operations such motors may be satisfactorily and practically wound, for extraordinary conditions of use wherein the material is especially hard or the cuts are usually deep, requiring an excess of reserve power, the construction shown in Fig. 3 will be found quite practical and desirable. In this construction, the shafts 6 and 10 are each provided with gear pinions 15 and 16. The driving motors 12'' and 13'' are each provided upon their armature shafts with drive gears 17 and 18, meshing with and driving the gears 15 and 16. It is obvious that each of the motors must be so connected to drive in the same direction of rotation, in relation with that of the other motor. The driving gears 15, 16, 17 and 18 are so proportioned in relation with the speed of the respective motors as to afford the required operating speed of the driven cutter heads. It is at once apparent that in this construction as well as in those before described, the entire independence of each cutter head is maintained so that any resistance or slowing down of the roughing cutter head due to the depth of cuts when operating close to the axis of the work or any acceleration of speed as result of reduced resistance or load when operating distantly from the axis of rotation is not communicated to the finishing cutter. The finishing cutter is maintained at a uniform and constant rate of rotation, entirely regardless of the rate of rotation of the roughing cutter. By avoiding such fluctuations of speed of the finishing cutter, a more smooth and finished surface is produced. Furthermore, the operation of the cutter heads being entirely independent of the driving means for the carriage, the carriage speed may be varied at will without affecting the speed of rotation of either cutter head.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. The combination with a pattern lathe including a reciprocatory carriage, a rotary roughening cutter head and a rotary finishing cutter head carried thereby for simultaneous engagement with the work of independent sources of driving power for each cutter head whereby a variation of speed of one cutter head will not affect the speed of rotation of the other cutter head.

2. The combination with a pattern lathe including a reciprocatory carriage and two revoluble cutter heads carried thereby for simultaneous engagement with a single piece of work of two driving motors carried by the reciprocatory carriage, each driving motor being operatively connected with one of the cutter heads for independent actuation thereof.

3. The combination with a pattern lathe including a reciprocatory carriage and two revoluble cutter heads carried thereby one of which operates upon the surface left by the operation of the other cutter upon a single body of work which they simultaneously engage, of two driving motors carried by the reciprocatory carriage, one of said cutter heads being mounted directly upon the armature shaft of each motor.

4. The combination with a pattern lathe including a reciprocatory carriage, a pair of shafts mounted upon the carriage, a cutter head upon each shaft in such relation to each other that they will simultaneously engage a single piece of work in closely adjacent paths of travel wherein one cutter operates upon the surface produced by the other cutter, and an independent driving motor for each shaft.

5. The combination with a pattern lathe including a reciprocatory carriage, a roughing cutter head and a finishing cutter head carried thereby for simultaneous engagement with a single piece of work whereon the finishing cutter head operates upon the surface produced by the roughening cutter head, and means for driving each cutter head independent of the operation of the other cutter head and further independent of the movement of the carriage.

In testimony whereof, we have hereunto set our hands this 10th day of June A. D. 1921.

SCOTT McGOWAN.
CLAUD L. LONG.

Witnesses:
HARRY F. NOLAN,
GEORGE C. HELMIG.